United States Patent [19]

Bonnes et al.

[11] Patent Number: 5,022,221
[45] Date of Patent: Jun. 11, 1991

[54] LAWN RAKE WITH IMPROVED SPRING ANCHORING

[75] Inventors: David R. Bonnes, Westerville; Philip J. Male, Columbus, both of Ohio

[73] Assignee: The Union Fork and Hoe Company, Columbus, Ohio

[21] Appl. No.: 501,771

[22] Filed: Mar. 30, 1990

[51] Int. Cl.⁵ .............................................. A01D 7/00
[52] U.S. Cl. ................................ 56/400.17; 56/400.21
[58] Field of Search ............ 56/400.01, 400.16, 400.17, 56/400.21

[56] References Cited

U.S. PATENT DOCUMENTS

| | | |
|---|---|---|
| D. 293,196 | 12/1987 | Germain et al. . |
| 695,139 | 3/1902 | Benson . |
| 948,497 | 2/1910 | Bullard . |
| 1,181,266 | 5/1916 | Stiles . |
| 1,780,180 | 11/1930 | Falstrom . |
| 1,837,677 | 12/1931 | Rocquin . |
| 1,870,739 | 8/1932 | Lambert . |
| 1,892,965 | 1/1933 | Rocquin . |
| 1,959,893 | 5/1934 | Bailie . |
| 1,970,616 | 8/1934 | Montan . |
| 2,137,795 | 11/1938 | Bailie . |
| 2,316,168 | 4/1943 | James . |
| 2,607,183 | 8/1952 | Happe et al. . |
| 2,766,577 | 10/1956 | Dorman . |
| 3,221,486 | 12/1965 | Godshall et al. . |
| 3,264,810 | 8/1966 | Lowell . |
| 3,394,537 | 7/1968 | Keene . |
| 3,707,835 | 1/1973 | McNally et al. . |
| 3,724,188 | 4/1973 | Eads . |
| 3,964,708 | 6/1976 | Reeves . |
| 4,215,528 | 8/1980 | Fodor . |
| 4,219,993 | 9/1980 | Cosmos . |
| 4,308,878 | 1/1982 | Silva . |
| 4,459,797 | 7/1984 | Gessel et al. . |
| 4,573,311 | 3/1986 | Ipema et al. ..................... 56/400.17 |
| 4,667,458 | 5/1987 | Barrett . |
| 4,667,461 | 5/1987 | Forbes . |
| 4,831,815 | 5/1989 | Bonnes . |
| 4,848,073 | 7/1989 | Germain et al. ............ 56/400.21 X |
| 4,850,185 | 7/1989 | Dimon ........................ 56/400.17 X |

FOREIGN PATENT DOCUMENTS 796116  6/1955  United Kingdom .

OTHER PUBLICATIONS

*The Washington Post*; "New Rake has Backbone Spring"; 10/29/50.

Primary Examiner—William P. Neuder
Attorney, Agent, or Firm—Vorys, Sater, Seymour & Pease

[57] ABSTRACT

The present invention is directed generally to improved lawn and garden rakes. The rake includes a rake head assembly having locking ramp means connected by flexibly resilient rake web means for releasable cooperation with portions of the tines so as to releasably retain the latter so as to facilitate tine replacement.

16 Claims, 2 Drawing Sheets

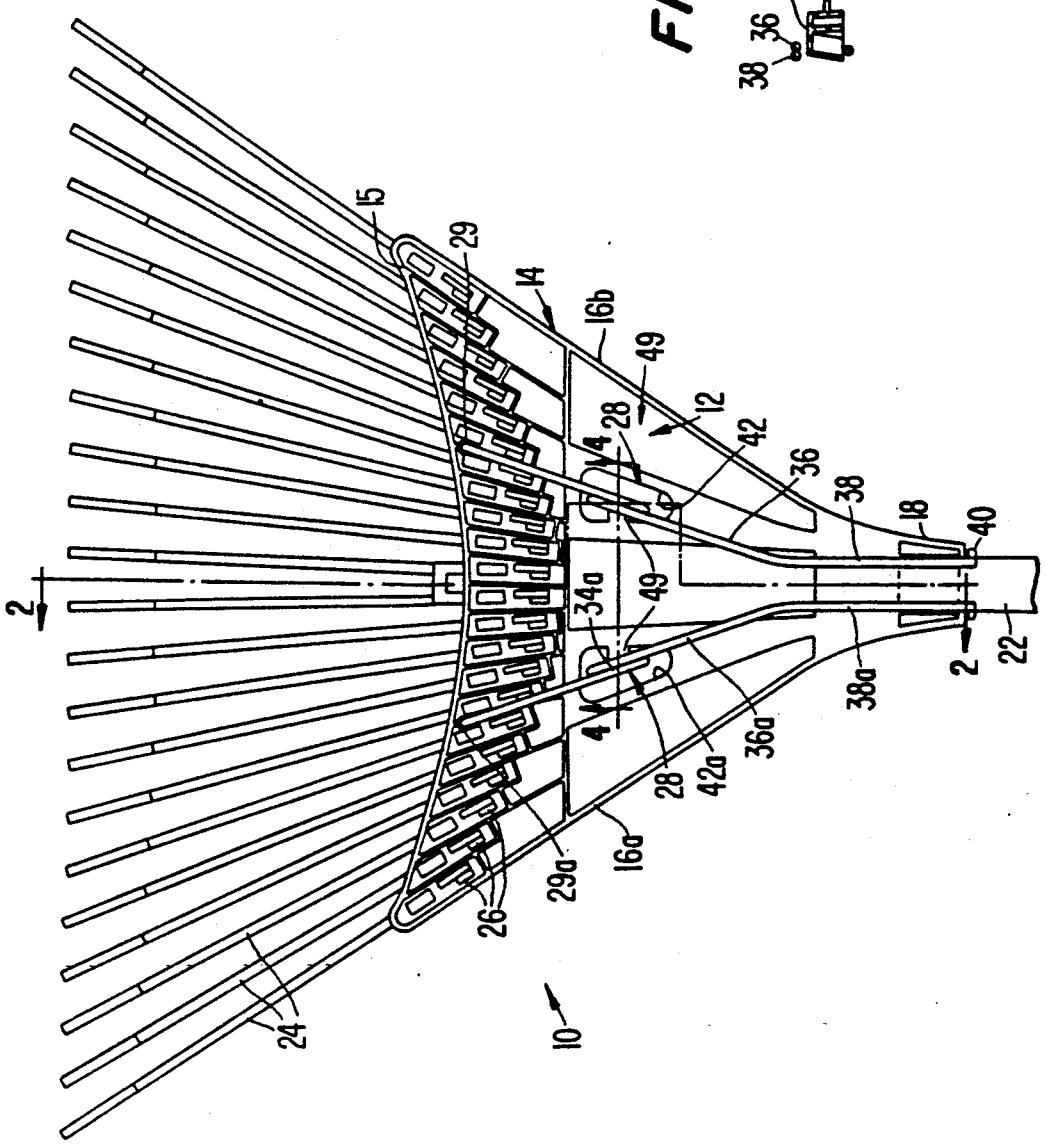

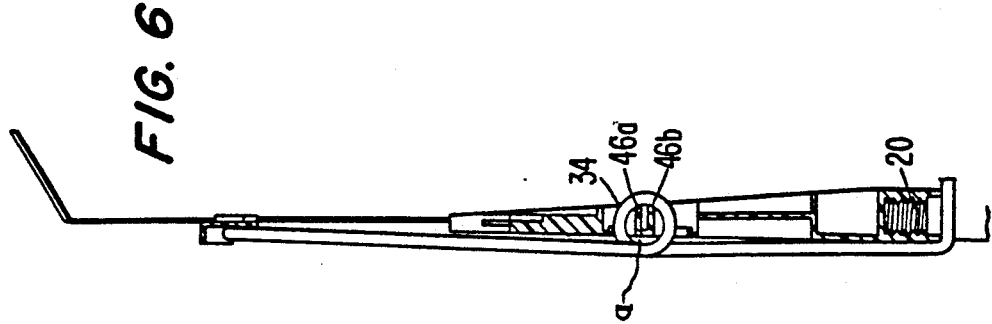
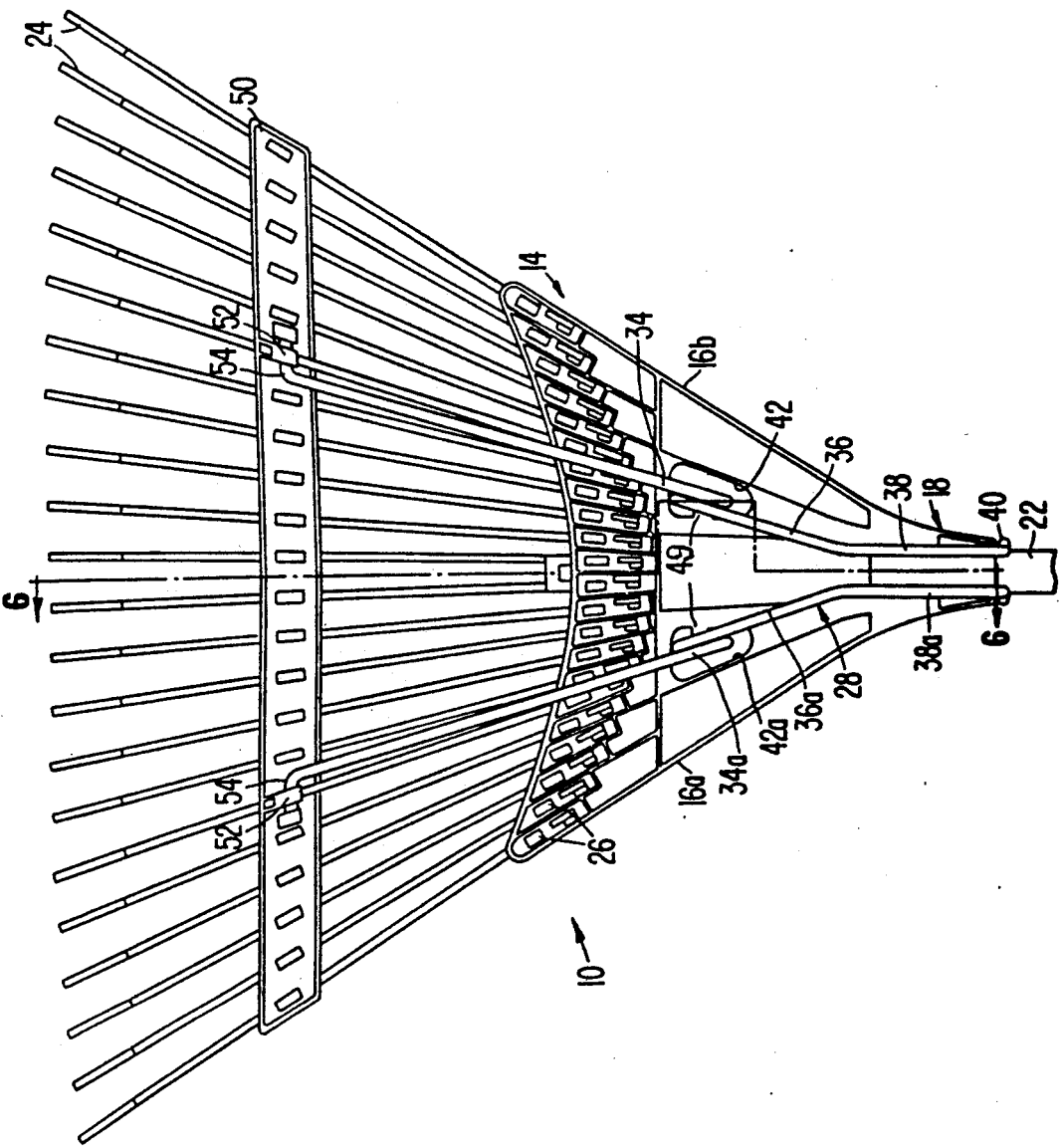

LAWN RAKE WITH IMPROVED SPRING ANCHORING

BACKGROUND OF THE INVENTION

This invention relates to a lawn rake having a spring member for stiffening the rake. More particularly, this invention relates to a lawn rake wherein a spring member is anchored in such a manner so as to lessen deflection of the lawn rake. Still more particularly, this invention relates to fixing a continuous loop spring having a coil anchored on the rake head, thereby providing improved stiffness and permitting use of a spreader member for holding the tines to an unitary molded plastic body.

In lawn rakes or similar hand tools, the use of a stiffening member, such as a spring, is well known. For example, in the Benson U.S. Pat. No. 695,139, a spring member is used for biasing a cleaning frame relative to the tines of a garden rake. The spring member includes a coil spring portion secured to the handle of the garden rake. Similarly, the Bullard U.S. Pat. No. 948,497 shows a similar cleaning attachment for a garden rake wherein the spring member has a coil secured to the handle of the rake and another coil spring intermediate the spring ends.

More recently, lawn and garden rakes have included stiffening members for stiffening the action of a plurality of tines secured by a spacer in a predetermined alignment. In general, such springs include a length of spring wire having a coiled portion intermediate the ends and having an end portion secured to the spacer and having the other end portion secured to the handle of the rake. Early examples of such a construction are shown in U.S. Pat. Nos. 1,959,893 and 2,137,795 to Bailie.

More recent examples of similar constructions are shown in the Germain et al, U.S. Pat. No. 4,848,073 and Des. U.S. Pat. No. 293,196, and to Ipema, U.S. Pat. No. 4,573,311. Each of these constructions includes a stiffening member in the form of a spring having a coiled spring portion intermediate the ends of the spring. One end of the spring is secured to a point forward of the rake body, such as at the forwardmost end of the rake body, or to the spreader member which spaces and secures the spacing of the rake tines. The other end of the spring is secured to a point near the rearmost portion of the rake, such as at the handle portion of the rake body, or to the handle itself.

Recently, rakes have been developed which are made from a unitary molded plastic body with various methods for securing the tines to the molded rake body.

It is an aim in the art to provide such a construction wherein the plastic molded body is further stiffened by securing an intermediate portion of the spring to the rake body itself. Such a construction addresses the problem of concentrating the forces caused by deflecting tines and thus the ends of the spring at the head and rear of the rake, by diffusing at least a portion of the forces to an intermediate portion of the rake body itself.

It is another problem in this art to use plastic spreaders for fixing the location of the tines and securing the tines in a spaced fan-like array. It is desired to use a plastic expander to cooperate with the tines; however, when such an expander is used as an anchor for the end of the stiffening member, it is necessary to accommodate significant pressures caused by the deflection of the spring. Thus, the expander structure becomes unnecessarily large, or it is necessary to use a more expensive, higher strength plastic for the expander member.

Accordingly, as will be discussed and understood, the rake according to the present invention provides a significant number of advantages over existing rakes wherein the present rake anchors the stiffening spring at a location intermediate the ends of the spring, such as at the coil portion, to a portion of the rake body, thus diffusing the forces of deflection otherwise concentrated at the spreader bar, or at the forwardmost end of the rake body.

SUMMARY OF THE INVENTION

Directed to achieving the foregoing objectives, and to overcoming the problems of prior art rakes incorporating a stiffening member, the rake according to the invention includes a rake body in the form of a plastic molded head with a molded handle receptacle and molded tine receptacles in the forward end to receive a plurality of tines in a spaced array. In one embodiment, the stiffening member has an end secured to the molded rake body near the forwardmost end thereof, and its other end formed as a loop having its plane transverse to the axis of the stiffening member. The transversely-extending loop of the stiffening member envelops at least a portion of a handle secured to the rake body. The stiffening member includes two forward extending portions of the type described, each having a coiled portion intermediate the anchored ends of the stiffening member.

According to the invention, an opening is formed in the rake body for receiving the coiled spring portion for movement transverse to the plane of the rake body. A laterally-ending lug member extends into the opening formed by the coiled spring portion to secure the coiled spring portion to the rake body. A portion of the lug member rests on the lowermost portion of the coiled spring to prevent deflection and when loads are placed on the underside of the rake body, such as when the rake is used as a shovel to move leaves or raked debris from one location to another.

In an alternative construction, the rake includes a tine spreader located forward of the forwardmost end of the rake body for securing and spacing the tines at a location forward of the rake body. The ends of the stiffening member are secured to the spreader member, rather than the rake body, as in the first embodiment. A significant advantage of such a construction wherein, an intermediate coiled spring portion is secured to the rake body, is that the spreader member may be made of a plastic material since the deflection forces on the spring are effectively diffused, at least in significant part, to the rake body.

These and other features and advantages of the invention will become apparent from a detailed written description of the invention which follows taken in conjunction with the accompanying drawings.

DESCRIPTION OF THE DRAWINGS

FIG. 1 is a plan view of a first embodiment of a lawn rake incorporating the spring construction and anchoring according to the invention:

FIG. 2 is a side cross-sectional view taken along line 2—2 of the embodiment of FIG. 1;

FIG. 3 is an end cross-sectional view of the rake body, showing an end of the stiffening member enveloping a significant portion of the handle;

FIG. 4 is a cross-sectional view taken along line 4—4 of FIG. 1;

FIG. 5 is a plan view of a second embodiment of a lawn rake incorporating the spring construction and anchoring according to the invention which is similar to FIG. 1, but which includes a spreader member for securing the tines in a spaced array forward of the rake body; and FIG. 6 is a side cross-sectional view taken along line 5—5 of FIG. 5.

DETAILED DESCRIPTION OF THE PREFERRED EMBODIMENTS

FIGS. 1 to 4 illustrate a first embodiment of a lawn rake according to the invention, designated by the reference numeral 10. The rake 10 is made from a rake head body 12 which is preferable molded as a single, unitary structure of a suitable plastic material such as polypropylene or the like. In the illustrated embodiment, the rake head 12 is illustrated as being of a conventional radially-shaped rake head, but other shapes could also be used. Moreover, the particular details of the rake head body 12 are not generally affected by the invention, except as indicated. The rake head body 12 includes a forward end 14 gently merging into shaped opposed side members 16a and 16b which together merged into a handle-engaging portion 18. The handle-engaging portion 18 defines a threaded form 20 for mating with a like thread form on the handle 22.

The forward end 14 of the rake head body 12 terminates a tine-engaging portion 15. A plurality of tines 24 are fixedly or removably secured in a like plurality of slots 26.

A stiffening member or means 28 is made from a continuous length or loop of heavy spring metal having an end turned inwardly to form a transversely-extending leg 30 terminating in a forwardly-extending leg 32 which is formed at a right angle to the leg 30. The leg 30 extends through an opening 29 in the forward portion 14 of the rake head body 12 so that the leg 30 lies underneath the rake head body. In this manner, a free end of the stiffening member 28 is secured to the forward portion of the rake head body 12.

The stiffening member 28 includes a coiled spring portion 34 formed in the leg 36 of the member. The leg 36 merges with a laterally-extending leg 38 which lies along the axis of the rake head body. The leg 38 merges in a loop 40 which lies generally perpendicular to the axis of the rake head body 12 as best seen in FIG. 3, and which envelops a significant portion of the handle 22. The stiffening member 28 further includes a second portion identical to the above-described portion and including a leg 38a parallel to the leg 38 merging forwardly with a leg 36a with terminates in a leg (not shown) which is similar to leg 30 lying in a second opening 29a in the forward portion of the rake head body 12 and terminating in a leg (not shown) which is similar to 32.

The rake head body 12 defines openings 42, 42a for receiving the coiled portions 34, 34a of the stiffening member 28. The openings 42, 42a are in the lug member 49 and have laterally extending rib legs 46a, 46b which extend into the coiled portions 34, 34a to define anchoring means intermediate the stiffening member 28. The legs 36, 36a extend over the top of the rake head body 12 in that region, as shown by the reference numeral 48 (FIG. 2). From a side view of FIG. 2, it can been seen that the lug member 49 is formed of a pair of rib legs 46a, 46b which protrude into the opening of the coiled spring portion 34 of the stiffening member 28. It will be appreciated that the anchoring means of the present invention contemplates use of a clip or clamp that can be used to secure the intermediate portion of the stiffening member to the rake body. The present invention contemplates that the stiffening member need not have an intermediate coil and that a clamp or other similar anchoring device can anchor the intermediate portion of the stiffening member to the rake body so as to diffuse the forces as does the illustrated embodiment.

Preferably, the bottom of the rib legs 46a, 46b is about in contact with the interior of the coiled spring portions 34, 34a, respectively, so that when forces are exerted on the tines to the left as shown in FIG. 2, representing raking, the coiled spring 28 has some freedom for movement to the right as shown in FIG. 2 out of contact with the rib 46 until the top of the rib contacts the coiled spring portion 34.

Such a construction advantageously concentrates the forces at the rake head body 12 in a way which is diffused over the entire head as opposed to the prior art. Specifically, forces of deflection are transmitted to the forward portion of the rake head body 12 by virtue of the stiffening member 28 and to the intermediate portion of the rake head 12 as described as well as to the handle portion 22.

While a coiled spring portion is shown and is a preferred construction for such springs, as in the prior art, such a spring member could also be made of other shapes and secured at an intermediate portion of the spring to an intermediate portion of the rake head to achieve a similar result in improvedly diffusing the deflections forces, as described. In addition, while a particular construction of the stiffening member is shown at the handle end, other constructions are known to the art and may thus also be used.

The embodiment of FIGS. 5 and 6 is substantially similar to the embodiment of FIGS. 1 to 4 with respect to the construction of the stiffening member and the rake head body 12. However, in this embodiment, a spreader member 50 is used forward of the forward edge of the rake head body 12 to secure the tines 24 and maintain their spacing. Preferably, the spreader 50 is made from plastic and includes an upraised flange 52 having a transversely extending opening to receive the transversely extending leg 54 of the stiffening member. It may thus be seen that the leg 54 extends laterally transversely in about the plane of the rake, rather than perpendicularly to the place of the rake as in the prior embodiment. Either mode of attachment is satisfactory.

From the foregoing description, it can be seen that there has been provided a rake head construction which is capable of being economically formed by molding the rake head body from a suitable plastic, and which is substantially stiffened by the expedient of securing an intermediate location of the stiffening member to the rake head body, thus improving its deflections vs. load characteristics. While there are described specific embodiments of the invention, those skilled in the art will understand that changes may be made in the form of the invention covered by the claims appended hereto without departing from the scope and spirit thereof, and that certain features of the invention may sometimes be used to an advantage without corresponding use of other features. Thus, the embodiments of the invention in which an exclusive property or privilege is claimed are defined in the appended claims.

WHAT IS CLAIMED IS:

1. A lawn rake comprising:

a rake head assembly including a rake head body assembly, a plurality of deflectable tines held in spaced relationship to each other by said head body assembly and a handle receiving portion formed in said body for a rake handle;

a rake handle coupled to said handle receiving portion of said body;

said head body assembly including anchoring means formed intermediate said head body assembly; and stiffening means including first and second end portion means coupled respectively to and between said rake head body assembly and said handle, said stiffening means including intermediate spring means anchored to said anchoring means and cooperating therewith for diffusing the forces caused by deflection of said tines whereby at least a portion of the deflection forces are diffused to said anchoring means by said intermediate spring means.

2. A rake head assembly comprising:

a rake head body assembly, a plurality of deflectable tines held in spaced relationship to each other by said head body assembly and a handle receiving portion formed in said body for a rake handle;

said head body assembly including anchoring means formed intermediate said head body assembly; and stiffening means including first and second end portion means couplable respectively to and between said rake head body assembly and a handle, said stiffening means including intermediate spring means anchored to said anchoring means and cooperating therewith for diffusing the forces caused by deflection of said tines and said first end portion means of said stiffening means, whereby at least a portion of the deflection forces are diffused to said anchoring means by said intermediate spring means.

3. A lawn rake comprising:

a rake head assembly including a rake head body assembly, a plurality of deflectable tines held in spaced relationship to each other by said head body assembly and a handle receiving portion formed in said body for a rake handle;

a rake handle coupled to said handle receiving portion of said body;

said head body assembly including anchoring means formed intermediate said head body assembly; and stiffening means including first and second end portion means coupled respectively to and between said rake head body assembly and said handle, said stiffening means including intermediate coiled spring means anchored to said anchoring means and cooperating therewith for diffusing the forces caused by deflection of said tines and said first end portion means of said stiffening means, whereby a portion of the deflection forces are diffused to said anchoring means by said coiled spring means.

4. The rake of claim 3 wherein said stiffening means is a continuous loop member and said coiled spring means is a coil spring formed integral with and intermediate said continuous loop.

5. The rake of claim 4 wherein said stiffening means includes a pair of said coiled spring means being formed integrally with said continuous loop.

6. The rake of claim 3 wherein said head assembly includes a pair of openings therein, each one of which receives therein one of said coiled spring means.

7. The rake of claim 6 wherein said anchoring means includes an anchoring projection extending into each of said head openings and being fitted into a respective ones of said coiled spring means for anchoring the latter.

8. The rake of claim 3 wherein said head assembly further includes a spreader which holds said tines in said spaced relationship and said first end means of said stiffening means being connected to said spreader.

9. The rake of claim 8 wherein said spreader is made of a plastic material.

10. A rake head assembly comprising:

a rake head body assembly, a plurality of deflectable tines held in spaced relationship to each other by said head body assembly and a handle receiving portion formed in said body for a rake handle;

said head body assembly including anchoring means formed intermediate said head body assembly; and stiffening means including first and second end portion means couplable respectively to and between said rake head body assembly and a handle, said stiffening means including intermediate spring means anchored to said anchoring means and cooperating therewith for diffusing the forces caused by deflection of said tines and said first end portion means of said stiffening means, whereby a portion of the deflection forces are diffused to said anchoring means by said coiled spring means.

11. The rake head assembly of claim 10 wherein said stiffening means is a continuous loop member and said coiled spring means is a coil spring formed integral with and intermediate said continuous loop.

12. The rake head assembly of claim 11 wherein said stiffening means includes a pair of said coiled spring means being formed integrally with said continuous loop.

13. The rake head assembly of claim 11 wherein said head assembly includes a pair of openings therein, each one of which receives therein one of said coiled spring means.

14. The rake head assembly of claim 12 wherein said anchoring means includes an anchoring projection extending into each of said head openings and being fitted into a respective ones of said coiled spring means for anchoring the latter.

15. The rake head assembly of claim 10 wherein said head assembly further includes a spreader which holds said tines in said spaced relationship and said first end means of said stiffening means being connected to said spreader.

16. The rake of claim 10 wherein said spreader is made of a plastic material.

* * * * *